Patented Jan. 2, 1934

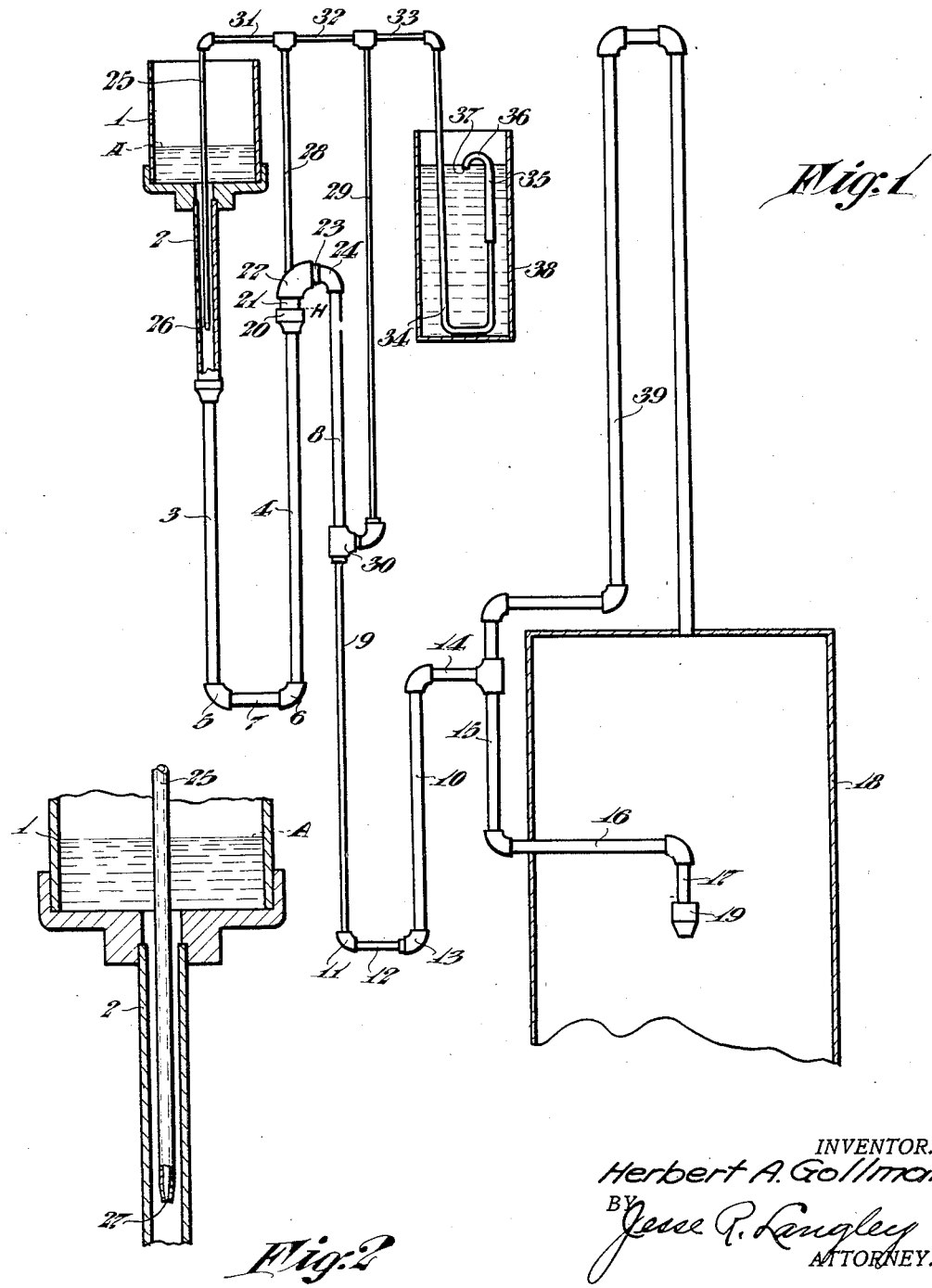

1,942,094

UNITED STATES PATENT OFFICE 1,942,094

FLOW CONTROL APPARATUS

Herbert A. Gollmar, West Caldwell, N. J., assignor to The Koppers Company of Delaware, a corporation of Delaware Application March 23, 1929. Serial No. 349,350

7 Claims. (Cl. 137—106)

This invention relates to flow control apparatus and particularly to apparatus for automatically discharging variable quantities of liquid intermittently into a desired space.

The present invention relates particularly to apparatus for periodically discharging variable quantities of a solvent into naphthalene and phenol removal systems, as, for instance, in naphthalene towers used in connection with gas purification, and may be applied to a tower similar to that shown and described in Patent No. 1,578,-687 to F. W. Sperr, Jr.

An object of the present invention is to provide a device which is capable of efficiently delivering small as well as large quantities of liquid periodically.

A further object is to provide a device by which the volumes of liquid delivered may be easily varied within certain limits, preferably from one pint to two or three gallons.

The preferred embodiment of my invention is shown in the accompanying drawing, in which Figure 1 is a view, partially in elevation and partially in cross section, of the device, applied to any desired chamber, and Fig. 2 is a detailed, enlarged view in cross section of a preferred form of a portion of the apparatus.

Referring to the drawing, the apparatus comprises in general a reservoir 1, into which the liquid to be automatically fed is permitted to enter; a plurality of pipe sections joined end to end so as to form a siphon and a trap; and a plurality of additional pipe sections which form an air trap and an air seal.

Extending downwardly from the reservoir 1 are a pipe 2 and a pipe 3, the latter being joined with the lower end of pipe 2, and the pipe 2 being preferably slightly larger in diameter than pipe 3. A pipe 4 is joined to the lower end of pipe 3 by any means such as elbows 5 and 6 and a pipe or nipple 7. Pipe 4 extends upwardly to a point preferably below the inlet end of pipe 2.

A pipe comprising an upper portion 8 and a lower portion 9 is joined to pipe 4, and extends downwardly to a point below the joint between pipes 3 and 4. Pipes 4, 8 and 9 function primarily as a siphon, and the said lower portion 9 is preferably of smaller diameter than the said upper portion 8, so that the outlet leg of the siphon is constricted.

The lower end of pipe portion 9 is joined with a pipe 10, which extends upwardly to a point preferably above the joint between pipes 3 and 4. Pipe portion 9 and pipe 10 are connected by any means, such as elbows 11 and 13 and a pipe or nipple 12. Pipe 10 is preferably larger than pipe 9 and of about the diameter of pipe 8, the latter being of about the same diameter as pipes 3 and 4.

The upper end of pipe 10 is joined with a pipe or series of pipes, such as 14, 15, 16 and 17, which extend substantially in a downward direction into a space or chamber, indicated by numeral 18, to be supplied with liquid. If desired, a spray nozzle 19 is attached to the lower end of pipe 17.

The upper bend of the siphon is preferably enlarged from the inlet leg to the uppermost point of the siphon. For instance, to the upper end of pipe 4 is attached a reducing coupling 20, and to the larger or upper end of the reducing coupling is attached a pipe or nipple 21 of larger diameter than pipe 4. To the nipple 21 is attached an elbow 22, and joining this elbow with pipe 8 are bushing 23 and elbow 24 of smaller diameter than elbow 22, so that pipe 8 is preferably of the same diameter as pipe 4.

The above mentioned air trap and seal comprise a plurality of pipe sections that are joined at various points to the pipe sections forming the siphon.

Extending downwardly into pipe 2 is a pipe 25 of smaller diameter than pipe 2. The lower end 26 of pipe 25 is free and open, and at a level below the joint between pipes 4 and 8. The pipe 25, as shown in Fig. 2, is preferably constricted at its lower end, the opening 27 being of smaller diameter than the pipe 25.

Extending upwardly from the enlarged portion of the siphon bend and opening into the elbow 22 is a pipe 28. A pipe 29 also extends upwardly and its lower end is joined with and opens into the outlet leg of the siphon preferably above the constricted portion 9, as for instance at 30.

Pipes 25, 28 and 29 are connected at an upper level, preferably above the inlet end of pipe 2, by means of pipes 31 and 32. A pipe 33 connects pipes 25, 28 and 29 to a seal or adjustable vent 34, placed in a tank 38.

The open end of the seal 34 is provided with an extension pipe 35 which telescopes the open end of the seal 34 and the pipe 35 may be raised or lowered to vary the effective head of the seal. Pipe 35 has a bent-over portion 36 so that the open end 37 is directed downward for the purpose set forth below.

A pipe designated in general by numeral 39 extends upwardly from pipe 14 to a point above the variable liquid level in the reservoir 1, and then turns downwardly into the chamber 18. The pipe 39 acts as an equalizer and is so constructed that the pipes 9, 12 and 10 function as a trap rather than as a siphon. It is readily understood that the pipe 39 need not enter chamber 18, but may extend upwardly merely. Where the device is to be used with a tower such as that mentioned above, the connection is preferably made.

In the operation of the apparatus, the trap formed by pipes 9, 12 and 10 is filled with the liquid to be fed to the chamber 18, and the seal 34 is also filled. Liquid is supplied to the tank 38 up to a level slightly above the open end 37. A small continuous stream of liquid is fed into the reservoir 1. The liquid fills both pipes 3 and 4, and gradually reaches the level of the open end 26 of pipe 25.

After the level of the liquid reaches pipe end 26, air is trapped in pipes 25, 28, 29 and 8 and a portion of pipe 9, as well as in the bend of the siphon, including the enlarged portion. As more liquid is added and the level thereof rises, pressure is applied to the trapped air. This pressure increases with the rise of the liquid in pipe 2 and in the reservoir 1, until it is released through the adjustable vent 34.

It may be assumed that the level of the liquid in reservoir 1 is at A when the vent releases. The level in the pipe 4 will be at a point H, and the vertical distance between A and H will equal the height of the liquid in the pipe 35 of seal 34. The air being released, the liquid in pipe 4 rises, fills the bend of the siphon, and the lower part of pipe 28 almost to the level A.

The apparatus is now no longer air-bound, and the liquid flows through the siphon bend, through pipes 8, 9, 10, 15 and 16, into chamber 18 and the air in pipes 8 and 9 is forced out through pipe 29.

While the liquid is draining and the level is falling from A to the pipe end 26, no air can be drawn into the pipes forming the air trap. The suction produced in the bend of the siphon at 22 when the liquid in the pipe 2 gets below the level of the said bend, serves the useful purpose of refilling the adjustable vent or seal 34, thus preparing it for the next discharge. Also, to further ensure the refilling of the seal 34 by this suction, the extension 35 is bent at 36 and enough liquid is originally placed in the tank 38 so that at the beginning of the operation, the opening 37 is slightly below the level of the liquid in the said tank.

As the level of the liquid in pipe 2 continues to fall, and as the liquid drains, the open end 26 of pipe 25 is uncovered. However, the liquid continues to flow until the level reaches that of pipe 14. The liquid drains in this way particularly when the end 26 of pipe 25 is constricted so as to prevent air from passing in too rapidly. After a short space of time, the pressure in the pipes forming the air trap reaches atmospheric pressure, and the levels in the seal 34 and the trap formed by pipes 9, 12 and 10 are equalized. This completes the cycle, and as the liquid continues to be fed into reservoir 1, the same cycle is repeated.

Before the apparatus is placed into operation, the extension 35 may be raised or lowered and the level of the liquid in the pipe 35 correspondingly raised or lowered so that the seal 34 will blow at the desired pressure and so that the desired amount of liquid will be delivered by the siphon.

The various parts of the apparatus are made of different sizes for certain reasons. The reservoir 1 may be of any size, depending upon the volume of liquid to be discharged. Pipes 2 and 3 may be of such diameter as to make it possible to discharge as little as one pint of liquid. The pipe 3 is of smaller diameter than pipe 2 so that the liquid will pass out more rapidly when it reaches the pipe 3.

The size of the siphon bend is increased at 22 for the following reason. During the part of the cycle when the pressure of the trapped air increases, the liquid level in the pipe 9 is depressed. This permits the liquid level to rise somewhat at H. By way of example, with pipe 9 of ½ inch diameter and the diameter at H 1½ inches, the ratio of the section areas is 1 to 9, so that when the level in pipe 21 rises one inch, the level in pipe 9 is lowered nine inches. The ratio should be kept high to prevent the liquid level at H from rising as high as the bend and allowing the liquid to run out before the seal 34 actually blows.

The outlet leg of the siphon is vented as at 30 for the reason that without this vent too much air remains in the apparatus after the seal is blown. Without this vent the air is pocketed in the outlet leg of the siphon and the liquid, particularly when discharged in small quantities, does not have enough force to flush the air out. Furthermore, the air tends to retard unduly the flow of the liquid.

The pipe 9 is of smaller diameter than pipe 8 for another reason in addition to the one already mentioned. When the apparatus is used in connection with shot-towers used in naphthalene and phenol removal systems, a fluctuating pressure in the shot-tower causes a fluctuating level in pipe 9. The smaller this pipe, the less will be the effect of this fluctuation.

It has been found practicable to construct the adjustable seal comprising pipes 34, 35 and 36 of tubing of smaller size than the smallest pipe heretofore used for the same purpose. For instance, the tubing 34 may have an inside diameter as low as three-sixteenths of an inch.

It is essential that all joints in the apparatus described be air tight.

When using the present apparatus in connection with shot-towers, such as that shown in Patent No. 1,578,687, the apparatus indicated by numerals 15, 18, 19 and 29 in said patent, may be substituted by the pipe system of the present invention. The present device is designed to deliver liquid in shots, the volume of which may be easily varied, and it is provided with means which ensure the elimination of air which is ordinarily likely to interfere with the flow of the liquid through the siphon.

I claim as my invention:

1. In apparatus for controlling the flow of liquids, a pipe having an inlet end and an outlet end for liquid, a portion of said pipe extending substantially downwardly from said inlet end, a second portion joined to the first named portion and extending upwardly, a third portion joined to the said second portion and extending downwardly to a point below the joint between the first named portion and the second named portion, the said third portion comprising an upper and a lower section, the said lower section being less in diameter than the said upper section, a fourth portion joined to the said third named portion and extending upwardly to a point above the said joint between the first named portion and the second named portion, and an outlet portion joined to the said fourth named portion and extending substantially downwardly, the said first, second and fourth portions and the upper section of the third portion being of substantially the same diameter.

2. Apparatus for controlling the flow of liquids, comprising in combination a siphon, a trap connected with the outlet leg of the said siphon, and means adapted to entrap air coming from a plurality of portions of the siphon up to a predetermined pressure when liquid is passed into the inlet leg of the siphon, the said means also adapted to permit the flow of liquid through the siphon and trap, after the said pressure is reached.

3. Apparatus for controlling the flow of liquids, comprising in combination a siphon, an inlet pipe leading downwardly to the lower end of the inlet leg of the said siphon, a trap connected with the outlet leg of the said siphon and air-entrapment means comprising a plurality of pipe sections joined with each other and with a liquid seal, the said pipe sections extending from and opening into respectively the said inlet pipe, the upper bend of the said siphon and the outlet leg of the said siphon.

4. Apparatus for controlling the flow of liquids, comprising in combination a siphon, an inlet pipe leading downwardly to the lower end of the inlet leg of the said siphon, a trap connected to the outlet leg of the said siphon and air-entrapment means comprising a plurality of pipe sections joined with each other and with a liquid seal, the said pipe sections extending from and opening into respectively the said inlet pipe, the upper bend of the said siphon and the outlet leg of the said siphon; the said seal being adjustable and adapted to permit the escape of air after a predetermined pressure has been reached and thereby permitting the flow of liquid through the said siphon and the said trap.

5. Apparatus for controlling the flow of liquids, comprising in combination a siphon, an inlet pipe leading downwardly to the lower end of the inlet leg of the said siphon, a trap connected to the outlet leg of the said siphon and air-entrapment means comprising a plurality of pipe sections joined with each other and with a liquid seal, the said pipe sections extending from and opening into respectively the said inlet pipe, the upper bend of the said siphon and the outlet leg of the said siphon, the said pipe section extending into the said inlet pipe, having a constricted opening.

6. Apparatus for controlling the flow of liquids, comprising a pipe having an inlet end and an outlet end for liquid, a portion of said pipe extending substantially downwardly from said inlet end, a second portion joined to the first named portion and extending upwardly, a third portion joined to the said second portion and extending downwardly to a point below the joint between the first named portion and the second named portion, a fourth portion joined to the said third named portion and extending upwardly to a point above the said joint between the first named portion and the second named portion, an outlet portion joined to the said fourth named portion and extending substantially downwardly, and an air-entrapment means adapted to entrap air coming from a plurality of the said portions when liquid is passed into the said inlet end and adapted to permit the flow of liquid through the said pipe after the air reaches a predetermined pressure.

7. Apparatus for controlling the flow of liquids, comprising a pipe having an inlet end and an outlet end for liquid, a portion of said pipe extending substantially downwardly from said inlet end, a second portion joined to the first named portion and extending upwardly, a third portion joined to the said second portion and extending downwardly to a point below the joint between the first named portion and the second named portion, a fourth portion joined to the said third named portion and extending upwardly to a point above the said joint between the first named portion and the second named portion, an outlet portion joined to the said fourth named portion and extending substantially downwardly, and an air-entrapment means comprising a plurality of pipe sections joined with each other and with a liquid seal, the said pipe sections extending from and opening into respectively the said inlet end, the said joint between the said second and third portions, and the said third portion.

HERBERT A. GOLLMAR.